United States Patent Office 3,218,733
Patented Nov. 23, 1965

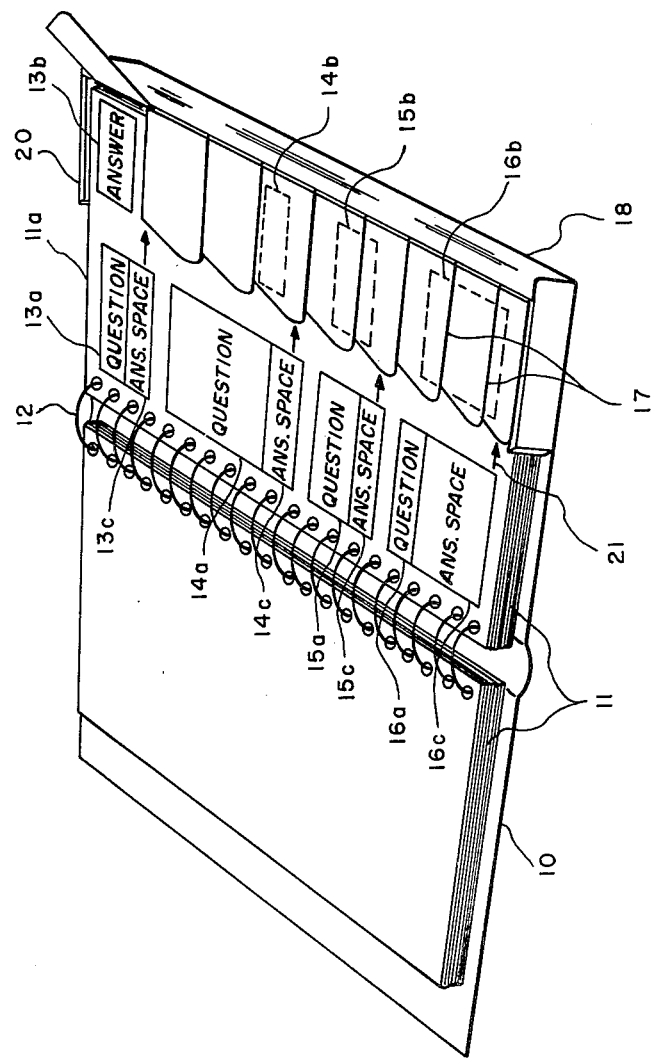
INVENTORS
ROBERT W. ROOP
JOHN C. SIEGRIST
BY Alfred Stapler
ATTORNEY

3,218,733
EDUCATIONAL APPARATUS
Robert W. Roop, Sewell, N.J., and John C. Siegrist, Wynnewood, Pa., assignors to General Atronics Corporation, Bala-Cynwyd, Pa., a corporation of Pennsylvania
Filed May 31, 1962, Ser. No. 198,775
6 Claims. (Cl. 35—9)

This invention relates to educational testing apparatus and more particularly to a device which conceals the answer to each of a series of questions until after the individual being tested has provided his own answer thereto.

It has been known to provide, for educational purposes, paper sheets containing a column of prepared questions, and, in a marginal portion of the sheet, prepared answers to these questions.

These sheets are inserted, either singly, or collectively in pad or booklet form, between a supporting surface and a series of flaps extending from the edge of the supporting surface adjacent the marginal portion containing the prepared answers and folded back over said marginal portion to conceal said answers. The individual being tested uses this material by first formulating his own answer to each question and, if desired, recording this answer in a space adjoining said question and then lifting up the flap concealing the corresponding prepared answer for verification of his own answer.

This prior art material does not lend itself readily to use with question-and-answer sheets on which the different questions and/or answers occupy widely disparate amounts of space. This is because it is inconvenient to lift up more than one flap at a time and, accordingly, the size of these flaps effectively determines and limits the amount of space which can be occupied by any one question and/or its corresponding answer.

Accordingly, it is an object of the invention to provide an educational testing device of the type under consideration which does not restrict the size of the spaces occupied by the questions and/or answers on the question-and-answer sheets used with it.

It is another object to provide an educational testing device of the type under consideration providing greater flexibility in terms of the spatial arrangement of the test questions and answers.

The above objects, as well as others which will appear, are achieved by means of a device comprising a supporting surface for the question-and-answer sheets and a plurality of flaps folded back over that edge of the supporting surface along which the prepared answers are located when the question-and-answer sheets are in place. These flaps are arranged in shingled fashion, that is with overlap between them at those edges at which they adjoin one another. Each flap is resiliently attached to the edge of the supporting surface, so that it can be lifted up without undue effort, but will tend to return to its original position (folded back over the supporting surface) upon release.

A preferred embodiment of the invention is illustrated in the single accompanying figure of drawings, to which reference may now be had.

In this figure there is shown a folder 10, in its open position. This folder provides the supporting surface for question-and-answer sheets 11, which are shown bound in a booklet by a binding 12, which is preferably of a type permitting the booklet to lie flat when open. A spiral binding is suitable for this purpose, but other forms of binding can, of course, also be used. Indeed the binding can be omitted altogether and separate sheets used.

On each of these question-and-answer sheets, such as that shown at 11a in position ready for use, there are preprinted in the left-hand portion a series of questions occupying, for example, the four spaces labeled "QUESTION" and bounded by rectangles 13a, 14a, 15a and 16a. There are also preprinted, in the right-hand portion of the sheet, the answers to these questions in the spaces labeled "ANSWER" and bounded by rectangles 13b, 14b, 15b and 16b. Below each question there is provided space for an answer to be inserted by the individual utilizing the apparatus. These latter spaces are labeled "ANSWER BLANK" and bounded by rectangles 13c, 14c, 15c and 16c.

Overlying the portion of sheet 11a containing the "ANSWER" spaces 13b, 14b, 15b and 16b are a series of flaps 17 which are all attached at one end to a vertical extension 18 of the supporting folder 10. These flaps 17 overlap one another so that, starting at the top of the series, each flap has its lower edge partly overlying the upper edge of the next lower flap. These flaps are made of a material having sufficient rigidity that lifting up of any one of these flaps lifts up all those above it simultaneously.

The edge of each flap 17 which is farthest from the vertical extension 18 is preferably not parallel to the vertical edge of the folder 10 but is skewed with respect to it, so that the lower left-hand corner of each flap forms a corner protruding horizontally appreciably beyond the adjoining portion of the next lower flap. Each flap is attached to vertical extension 18 in such a manner that when the flap is raised by being pivoted about the line of attachment, a restoring force is exerted on the flap tending to cause it to fall back down into position covering sheet 11a. This may be accomplished by simply making the attachment of some binding which is sufficiently stiff to provide the necessary resistance to lifting of the flaps. Alternatively, more or less elaborate springing arrangements may, of course, also be used.

Question 13a may be answered in blank space 13c and the correctness of the answer verified by lifting the top-most flap 17 concealing answer 13b. This flap is shown raised in the drawing.

Question 14a, on the other hand, may be answered in blank space 14c and the answer verified by lifting the flap 17 concealing answer 14b. It will be noted that, due to the overlapping of flaps 17, all of the flaps above the desired one will be lifted up at the same time, but this does no harm since the questions will normally be answered in sequence from top to bottom and accordingly the individual being tested will already have committed himself to an answer to question 13a. On the other hand, a prepared answer extending over the space covered by more than one flap 17 can be revealed with a single lifting motion. This feature is used to advantage in connection with question-and-answer set 15a, 15b and 15c. The space occupied by the prepared answer 15b is so large that two adjacent flaps 17 are needed to conceal all of it. Nevertheless, lifting up of the lower of these two flaps exposes the entire answer, since the next higher flap is raised by the same motion. Similarly the space 16b required for the prepared answer to question 16a requires more than one flap 17 for concealment, but again lifting up of the lowermost of these flaps exposes the entire answer.

It is apparent that if the spaces occupied by the questions and answers on another question-and-answer sheet 11 are different from those shown in the figure, this is readily accommodated by the apparatus shown, still without the need to lift more than one flap at a time to expose the complete prepared answer to a question.

The proportioning of the individual flaps 17 will depend upon the dimensions of the spaces expected to be occupied by the various combinations of questions and fill-in answers. In order to accommodate the greatest possible variety of question-and-answer lengths with one set of flaps 17, the exposed height of each flap is preferably at least as great as the total vertical dimension of the space occupied by the shortest combination of a question and the prepared and fill-in answers to that question.

To make it easier for the user to determine which flap to lift to expose a particular preprinted answer arrows such as shown at 21 in the drawing may be printed on the question-and-answer sheet pointing to the appropriate flap corner to be lifted for each set of questions and answers.

In order to position the booklet 11 properly in relation to the flaps 17, there are preferably provided two stops 19 and 20 which define the space in which the booklet is to be inserted. These stops may be in the form of wooden blocks attached in any suitable manner either to cover 10 or to a wooden spine (not shown) which may be inserted along vertical extension 18 to prevent that extension from collapsing due to careless handling or repeated use of the apparatus.

Various modifications are possible without departing from the inventive concept. For example, a second set of flaps, similar to flaps 17, may be attached to the leftmost edge of open cover 10, in which case the reverse sides of sheets 11 can also be used for questions and answers. On these reverse sides the prepared answers to be concealed by the added flaps would be positioned along the left-hand edge of the sheet and the prepared questions and blank answer spaces along the right-hand edge.

Accordingly, I desire the scope of the invention to be limited only by the appended claims.

We claim:
1. Educational apparatus comprising: a supporting surface for a sheet containing along one edge a series of prepared questions each accompanied by space for a fill-in answer, and along the opposite edge a series of prepared answers corresponding to and respectively aligned with the respective questions and fill-in answer spaces; and a plurality of flaps resiliently attached to the edge of said supporting surface nearest said opposite edge so as to fold back over said sheet and cover said prepared answers, successive ones of said flaps only partly overlapping one another in sequence in a direction parallel to said opposite edge, said flaps being so dimensioned and having sufficient rigidity that by lifting up and releasing one of said flaps, more than one said answer may be uncovered and covered.

2. The apparatus of claim 1 characterized in that the non-overlapping portion of each flap has a dimension at least as great as the combined dimension of the shortest question and corresponding fill-in answer and prepared answer.

3. The apparatus of claim 2 further characterized by the provisions of stops for defining the position of said sheet relative to said flaps.

4. The apparatus of claim 1 further characterized in that each of said flaps protrudes at one unattached corner beyond the adjacent flap which it overlaps in a direction transverse to said predetermined direction.

5. The apparatus of claim 4 further characterized in that said flaps are spaced from said surface at said supporting surface edge.

6. The apparatus of claim 5 further characterized in that each said flap has sufficient rigidity that lifting up of said flap at its said unattached end causes lifting of all flaps over-lapping it.

References Cited by the Examiner

UNITED STATES PATENTS

| | | | |
|---|---|---|---|
| 909,477 | 1/1909 | Thompson | 35—48 |
| 1,995,674 | 3/1935 | Power | 129—1 |
| 1,997,320 | 4/1935 | Smythe | 129—16 |
| 2,137,447 | 11/1938 | Ellis | 35—48 |
| 2,234,075 | 3/1941 | Carolin | 35—48 |
| 2,531,142 | 11/1950 | Madison | 35—9 |
| 2,628,435 | 2/1953 | Minninger | 35—35 |
| 2,751,690 | 6/1956 | Cohen | 35—48.1 |
| 3,097,435 | 7/1963 | Goldschimdt | 35—9 |
| 3,145,481 | 8/1964 | Aldershof | 35—8 |

JEROME SCHNALL, *Primary Examiner.*

ABRAHAM BERLIN, *Examiner.*